United States Patent
Song et al.

(10) Patent No.: US 12,094,183 B2
(45) Date of Patent: Sep. 17, 2024

(54) GEOMETRIC PATTERN MATCHING METHOD AND DEVICE FOR PERFORMING THE METHOD

(71) Applicant: Fourth Logic Incorporated, Gyeonggi-do (KR)

(72) Inventors: Jong Hyun Song, Gyeonggi-do (KR); Kang Cho, Gyeonggi-do (KR)

(73) Assignee: FOURTH LOGIC INCORPORATED, Anyang-si (KR)

( * ) Notice: Subject to any disclaimer, the term of this patent is extended or adjusted under 35 U.S.C. 154(b) by 284 days.

(21) Appl. No.: 17/657,845

(22) Filed: Apr. 4, 2022

(65) Prior Publication Data

US 2023/0065041 A1    Mar. 2, 2023

(30) Foreign Application Priority Data

Aug. 25, 2021    (KR) .................. 10-2021-0112120

(51) Int. Cl.
*G06V 10/46*  (2022.01)
*G06V 10/72*  (2022.01)
*G06V 10/74*  (2022.01)

(52) U.S. Cl.
CPC ............ *G06V 10/469* (2022.01); *G06V 10/72* (2022.01); *G06V 10/761* (2022.01)

(58) Field of Classification Search
None
See application file for complete search history.

(56) References Cited

U.S. PATENT DOCUMENTS

| | | | |
|---|---|---|---|
| 6,671,049 B1 * | 12/2003 | Silver | G03F 9/7076 356/399 |
| 7,006,694 B1 * | 2/2006 | Melikian | G06V 10/46 382/199 |
| 8,437,502 B1 * | 5/2013 | Siddiqui | G06T 7/73 382/199 |
| 10,282,431 B1 * | 5/2019 | Bhotika | G06F 16/5838 |
| 2004/0051795 A1 * | 3/2004 | Ajioka | G06V 10/955 348/222.1 |
| 2004/0096092 A1 * | 5/2004 | Ikeda | G06T 7/12 382/199 |
| 2008/0219516 A1 * | 9/2008 | Suzuki | G06V 40/161 382/209 |
| 2017/0243042 A1 * | 8/2017 | Walch | G06V 40/70 |
| 2018/0121754 A1 * | 5/2018 | Carr | G06V 20/00 |
| 2018/0336407 A1 * | 11/2018 | Namiki | H04N 23/80 |
| 2021/0216827 A1 * | 7/2021 | Hayaishi | G06V 10/26 |
| 2022/0148302 A1 * | 5/2022 | Bao | G06V 10/761 |

* cited by examiner

*Primary Examiner* — Soo Shin
(74) *Attorney, Agent, or Firm* — Mark T. Vogelbacker; TaeRa Kim Franklin; Eckert Seaman Cherin & Mellott, LLC

(57) ABSTRACT

A geometric pattern matching method and a device for performing the method includes determining, by a geometric pattern matching device, information on reference geometric pattern contour points for a learning object on a learning image. The method can further include determining, by the geometric pattern matching device, information on detection object contour points for a detection object on a detection image, and performing, by the geometric pattern matching device, geometric pattern matching between the learning object and the detection object on the basis of the information on the reference geometric pattern contour points and the information on the detection object contour points.

14 Claims, 10 Drawing Sheets

FIG. 2

$$\begin{cases} M_{10} < M_{11} \leq M_{12} \\ M_{01} < M_{11} \leq M_{02} \\ M_{00} < M_{11} < M_{22} \\ M_{02} < M_{11} < M_{20} \end{cases}$$

if ) $-22.5° \leq D_{11} \leq 22.5°$ if ) $D_{11} \leq -67.5°$, $D_{11} \geq 67.5°$ if ) $22.5° < D_{11} < 67.5°$ if ) $-67.5° < D_{11} < -22.5°$ $M_{xy}$: VALUE OF CHANGE RATE MAGNITUDE AT (X,Y) COORDINATES
$D_{xy}$: VALUE OF CHANGE RATE DIRECTION AT (X,Y) COORDINATES
$M_{11}$: VALUE OF CHANGE RATE MAGNITUDE OF PIXEL AT REGION OF INTEREST
$D_{11}$: VALUE OF CHANGE RATE DIRECTION OF PIXEL AT REGION OF INTEREST

CONTOUR POINT DETERMINATION CONDITION(200)

| $M_{00}$ | $M_{01}$ | $M_{02}$ |
|---|---|---|
| $M_{10}$ | $M_{11}$ | $M_{12}$ |
| $M_{20}$ | $M_{21}$ | $M_{22}$ |

Derivative

FIG. 3
(a) LEARNING IMAGE (300)
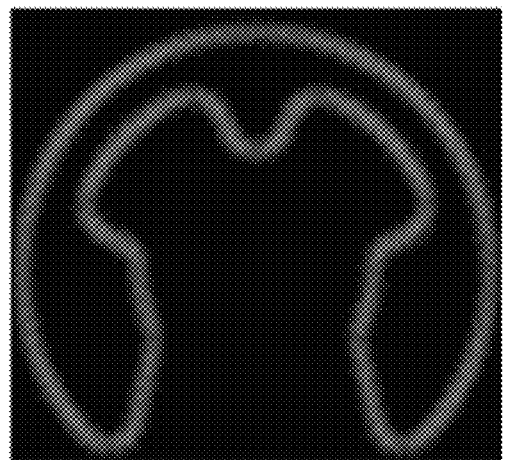
(b) CHANGE RATE MAGNITUDE
INFORMATION STORAGE TABLE (310)
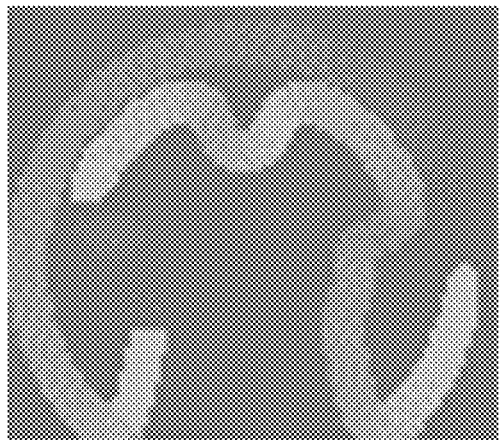
(c) CHANGE RATE DIRECTION
INFORMATION STORAGE TABLE (320)
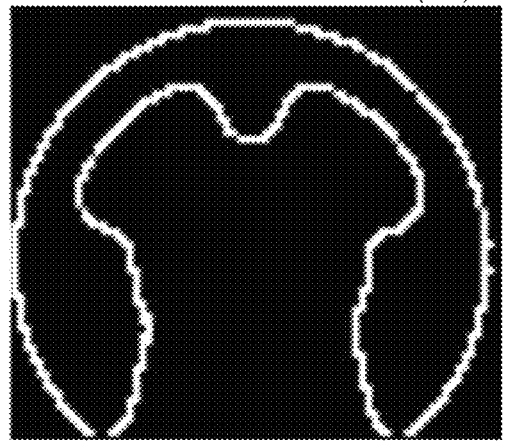
(d) CONTOUR POINT INFORMATION
STORAGE TABLE (330)

FIG. 4
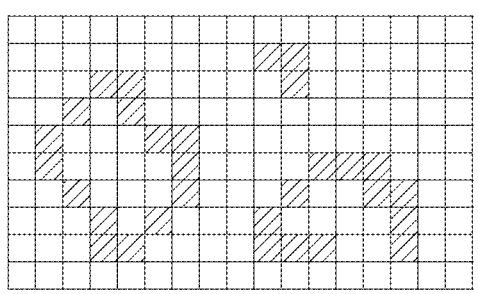
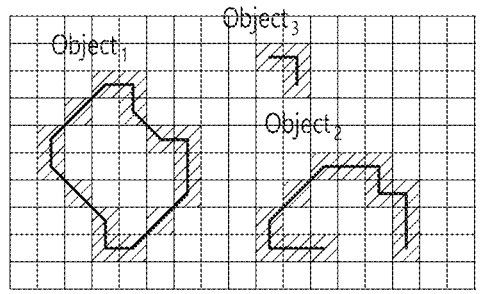
OBJECTIFICATION USING CONNECTION PIXELS
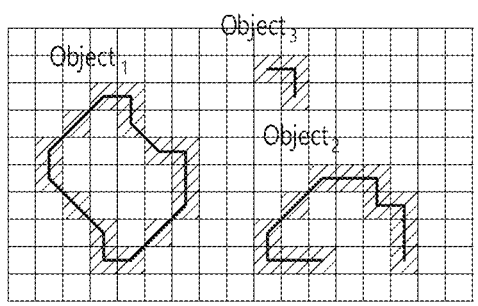
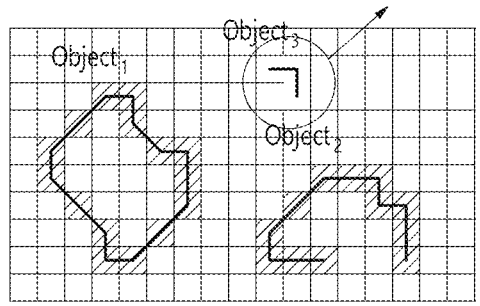
LEARNING OBJECT CONTOUR POINT(410)
RESULT OF APPLYING NOISE DETERMINATION REFERENCE VALUE
(a)
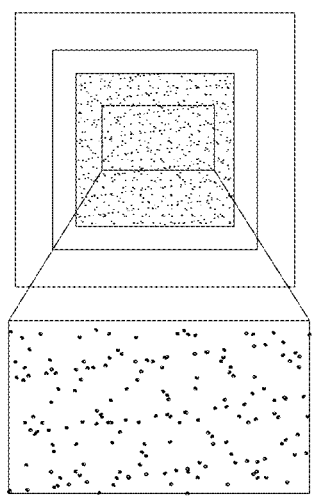
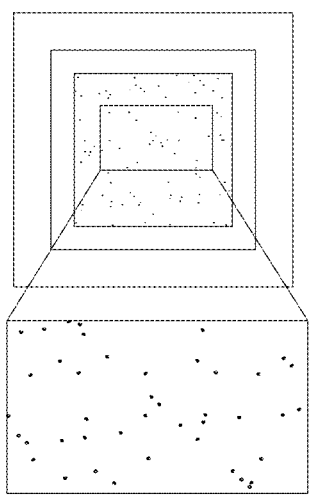
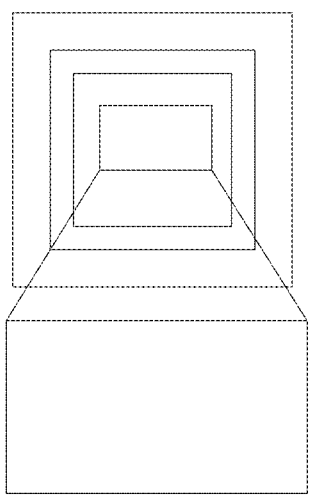
(a) THRESHOLD VALUE: 1/10 OF SUM OF SQUARES
(b) THRESHOLD VALUE: 1/2 OF SUM OF SQUARES
(c) THRESHOLD VALUE: SUM OF SQUARES
(b)

FIG. 5
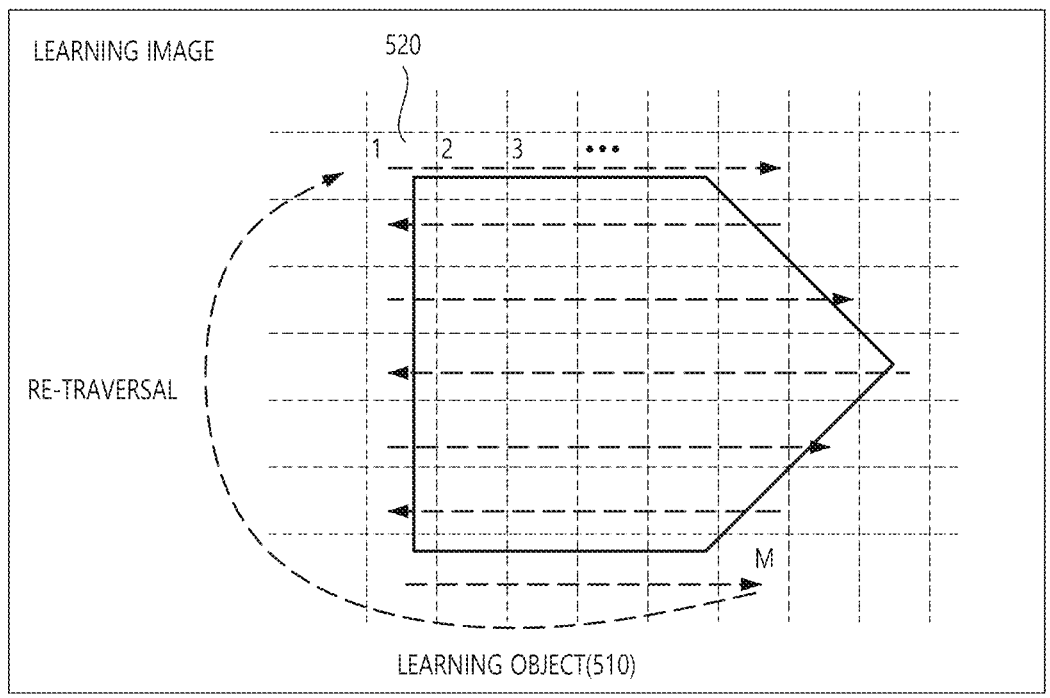
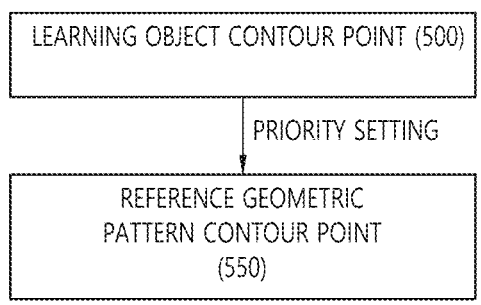

FIG. 9

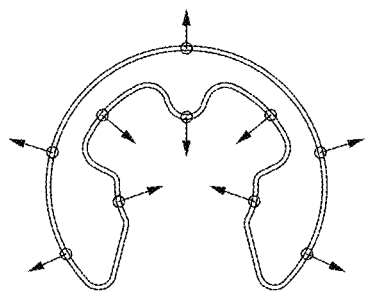

(1) WEAK GEOMETRIC SIMILARITY MATCHING USING SPREAD CONTOUR-DIRECTION IMAGE
(a) FIRST GEOMETRIC PATTERN MATCHING(910)

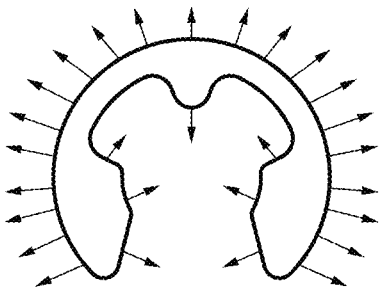

(b) NEAREST POSITION (MAXIMUM TOLERANCE)
(a) ACCURATE POSITION (2) WEAK GEOMETRIC SIMILARITY MATCHING USING SPREAD EXPANSION-DIRECTION IMAGE
(b) SECOND GEOMETRIC PATTERN MATCHING(920)

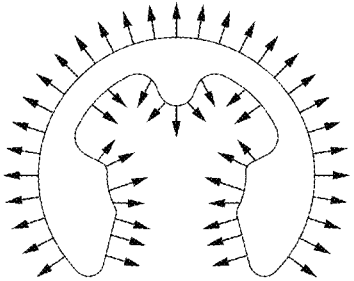

(c) NEAREST POSITION (TOLERANCE)(b)
NEAREST POSITION (TOLERANCE)(a)
ACCURATE POSITION (3) WEAK GEOMETRIC SIMILARITY MATCHING THROUGH CONTOUR-DIRECTION IMAGE
(c) THIRD GEOMETRIC PATTERN MATCHING(930)

- - - - - ▶ : DIRECTION OF MATCHED POSITION OF ACCURATE POSITION :
———▶ DIRECTION OF MATCHED POSITION OF NEAREST POSITION :
━━▶ DIRECTION OF MATCHED POSITION OF NEARBY POSITION

GEOMETRIC PATTERN MATCHING METHOD AND DEVICE FOR PERFORMING THE METHOD

CROSS-REFERENCE TO RELATED APPLICATION

This application claims the benefit of Korean Patent Application No. 10-2021-0112120, filed on Aug. 25, 2021, the disclosure of which is incorporated herein by reference in its entirety.

BACKGROUND

1. Field of the Invention

The present invention relates to a geometric pattern matching method and a device for performing the method. More specifically, the present invention relates to a geometric pattern matching method for rapidly detecting identical or similar geometric patterns in the fields of digital image processing and machine vision, and a device for performing the method.

2. Discussion of Related Art

Pixels constituting a digital image have characteristics independent of each other and a plurality of pixels are arranged on a screen so that geometric shapes are displayed. Geometric shapes in a digital image may be expressed as geometric patterns of objects by connecting neighboring contour pixels and grouping the neighboring contour pixels into one group.

In conventional geometric pattern matching technology, X and Y coordinates of contour pixels among pixels, which represent contours, are stored in an array in a memory secured by the number of contour pixels, and geometrically identical learned patterns in a detection image are detected by comparing absolute positions of the contour pixels at coordinates with absolute positions of contour pixels of a detection target at coordinates.

However, in the conventional geometric pattern matching technology, all positions of numerous contour pixels extracted as contours are compared. Therefore, the comparison operation takes a long time, and in particular, when there is a lot of noise in a detection image, there is a limit to comparing only absolute positions due to the large amount of noise.

Therefore, there is a need for research on a method of performing pattern matching more rapidly and accurately.

SUMMARY OF THE INVENTION

The present invention is directed to solving all of the above problems.

Further, the present invention is directed to performing pattern matching rapidly and accurately at low cost by performing geometric pattern matching using an algorithm that is robust to noise and an occlusion phenomenon of a detection image in order to rapidly detect identical or similar patterns on a detection image using a conditional probability using a geometric pattern that meets a given condition.

Further, the present invention is also directed to performing matching that is robust to noise and occlusion by enabling the extraction of a geometric pattern for a desired learning object selectively rather than learning a geometric pattern for a randomly selected object and by matching learned geometric patterns for a detection object using a conditional probability.

A representative configuration of the present invention for achieving the above objects is as follows.

According to an aspect of the present invention, there is provided a geometric pattern matching method including determining, by a geometric pattern matching device, reference geometric pattern information for a learning object on a learning image, determining, by the geometric pattern matching device, detected geometric pattern information for a detection object on a detection image, and performing, by the geometric pattern matching device, geometric pattern matching between the learning object and the detection object on the basis of the reference geometric pattern information and the detected geometric pattern information.

Meanwhile, the reference geometric pattern information may include a plurality of learning object contour points, and the plurality of learning object contour points may be determined by removing noise among a plurality of contour points satisfying a contour point determination condition from among a plurality of pixels on the learning image.

Further, the detected geometric pattern information may include a plurality of detection object contour points, the geometric pattern matching may be performed based on a conditional probability, and the conditional probability may be determined based on information on the plurality of learning object contour points and information on the plurality of detection object contour points.

According to another aspect of the present invention, there is provided a geometric pattern matching device for performing geometric pattern matching, the geometric pattern matching device including an image receiving unit configured to receive a learning image and/or a detection image and a processor operatively connected to the image receiving unit, wherein the processor may be implemented to determine reference geometric pattern information for a learning object on the learning image, determine detected geometric pattern information for a detection object on the detection image, and perform geometric pattern matching between the learning object and the detection object on the basis of the reference geometric pattern information and the information on the detection object contour points.

Meanwhile, the reference geometric pattern information may include a plurality of learning object contour points, and the plurality of learning object contour points may be determined by removing noise among a plurality of contour points satisfying a contour point determination condition from among a plurality of pixels on the learning image.

Further, the detected geometric pattern information may include a plurality of detection object contour points, the geometric pattern matching may be performed based on a conditional probability, and the conditional probability may be determined based on information on the plurality of learning object contour points and information on the plurality of detection object contour points.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a conceptual diagram illustrating a method of determining reference geometric pattern information on a learning image according to an embodiment of the present invention;

FIG. 3 illustrates conceptual diagrams illustrating information storage tables according to an embodiment of the present invention;

FIG. 4 illustrates conceptual diagrams illustrating a method of determining learning object contour points by removing noise according to an embodiment of the present invention;

FIG. 5 illustrates a conceptual diagram illustrating a method of determining the priority of learning object contour points according to an embodiment of the present invention;

FIG. 9 illustrates conceptual diagrams illustrating a three-step geometric pattern matching process according to an embodiment of the present invention.

DETAILED DESCRIPTION OF EXEMPLARY EMBODIMENTS

Figure 1:
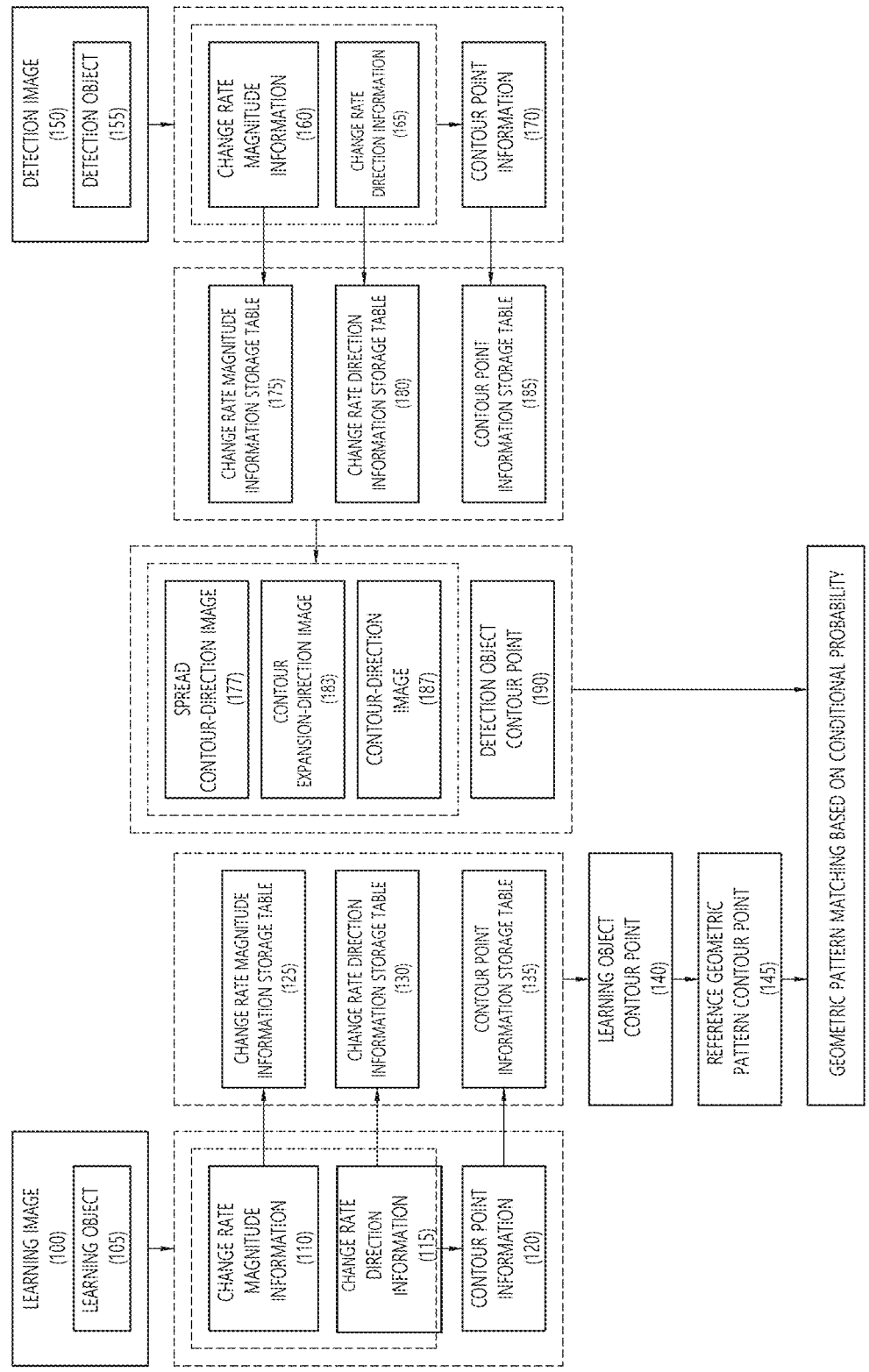
FIG. 1 is a conceptual diagram illustrating a geometric pattern matching method according to an embodiment of the present invention.

The detailed description of the present invention will be made with reference to the accompanying drawings illustrating examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

FIG. 1 is a conceptual diagram illustrating a geometric pattern matching method according to an embodiment of the present invention.

Referring to FIG. 1, a method of performing geometric pattern matching based on a learning image 100 and a detection image 150 is disclosed.

The learning image 100 may include a learning object 105 and the detection image 150 may include a detection object 155. In the geometric pattern matching method, reference geometric pattern contour points 145 may be determined based on the learning object 105, and whether the detection object 155 matching the learning object 105 is present on the detection image 150 may be determined using a conditional probability with respect to the reference geometric pattern contour points 145.

Specifically, change rate magnitude information 110 and change rate direction information 115 of pixels on the learning image 100 may be determined. Thereafter, contour points on the learning image 100 may be determined based on the change rate magnitude information 110 and the change rate direction information 115.

The change rate magnitude information 110, the change rate direction information 115, and contour point information 120 may be included in a change rate magnitude information storage table 125, a change rate direction information storage table 130, and a contour point information storage table 135 including information on the contour points, respectively.

Noise other than the contour points of the learning object may be removed from among extracted contour points by connecting connection pixels having a change rate magnitude which is greater than or equal to a change rate threshold value on the basis of the change rate magnitude information storage table 125 and the contour point information storage table 135. Learning object contour points 140 with respect to contour points of an actual learning object, from which noise is removed, among the contour points may be determined.

The reference geometric pattern contour points 145 reflecting a geometric structure of the learning object may be determined by setting the priority of the learning object contour point 140 in consideration of a degree of spreading. A set of the reference geometric pattern contour points 145 is expressed using the term "reference geometric pattern contour point group."

Thereafter, in order to detect the detection object 155 on the detection image 150, change rate magnitude information 160, change rate direction information 165, and contour point information 170 may be determined in consideration of pixels on the detection image 150. A change rate magnitude information storage table 175, a change rate direction information storage table 180, and a contour point information storage table 185 for the detection image 150 may be generated based on the change rate magnitude information 160, the change rate direction information 165, and the contour point information 170 for the detection image 150.

The change rate magnitude information storage table 175, the change rate direction information storage table 180, and the contour point information storage table 185 for the detection image 150 may be generated in the same manner as the change rate magnitude information storage table 125, the change rate direction information storage table 130, and the contour point information storage table 135 for the learning image 100.

In the present invention, the contour points that satisfy a contour point determination condition extracted from the detection image 150 may be expressed using the term "detection object contour points 190." Alternatively, similarly to the learning object contour points 140, the contour points remaining by performing a noise removal procedure in consideration of the connection pixels on the contour points extracted from the detection image 150 may be expressed using the term "detection object contour points 190." The contour point information storage table 185 for the detection image 150 may store information on the detection object contour points 190.

Geometric pattern matching by which the reference geometric pattern contour points 145 and the detection object contour points 190 are compared and matched may be performed based on a conditional probability.

Specifically, a total of three images such as a spread contour-direction image 177, a contour expansion-direction image 183, and a contour-direction image 187 which are generated by overlapping the change rate magnitude information storage table 175, the change rate direction information storage table 180, and the contour point information storage table 185 for the detection image 150 may be generated. Based on the spread contour-direction image 177, the contour expansion-direction image 183, and the contour-direction image 187, whether the detection object 155 corresponding to the learning object 105 is present on the detection image may be determined through a total of three steps of sequential geometric pattern matching in consideration of the reference geometric pattern contour points 145 and the detection object contour points 190 of the detection image 150.

Hereinafter, an operation of determining the reference geometric pattern contour points 145 based on the specific learning object 105 and an operation of performing geometric pattern matching operation by comparing and matching the reference geometric pattern contour points 145 and the detection object contour points 190 of the detection image are disclosed.

The geometric pattern matching according to the embodiment of the present invention may be performed by a geometric pattern matching device. The geometric pattern matching device may include an image receiving unit that receives a learning image and/or a detection image, and a processor that is operatively connected to the image receiving unit. The processor may be implemented to perform the geometric pattern matching method described above and below.

For example, the processor may be implemented to determine information on the reference geometric pattern contour points for the learning object on the learning image, determine information on the detection object contour points for the detection object on the detection image, and perform geometric pattern matching between the learning object and the detection object on the basis of the information on the reference geometric pattern contour points and the information on the detection object contour points. The information on the reference geometric pattern contour points may include information on a plurality of learning object contour points to which a priority is assigned, and the plurality of learning object contour points may be determined by removing a contour point corresponding to noise among a plurality of contour points that satisfy a contour point determination condition from among a plurality of pixels on the learning image. The geometric pattern matching may be performed based on a conditional probability, and the conditional probability may be determined in consideration of whether at least one of the plurality of learning object contour points determined in consideration of the priority matches the plurality of detection object contour points.

FIG. 2 is a conceptual diagram illustrating a method of determining reference geometric pattern information on a learning image according to an embodiment of the present invention.

In FIG. 2, a method of generating a change rate magnitude information storage table, a change rate direction information storage table, and a contour point information storage table is disclosed.

Referring to FIG. 2, in order to extract the reference geometric pattern information on the basis of a plurality of pixels in a learning image, direction information of each of the plurality of pixels may be determined.

The direction information of the pixel may be determined in various ways. For example, the direction information of the pixel may be determined based on a differential filter. The direction information may include information on a change rate magnitude and change rate direction of the pixel in x and y directions obtained using a differential filter.

Equation 1 below is an equation for calculating the change rate magnitude and change rate direction of the pixel.

$$M_{xy} = |\text{Filter } X(x, y)| + |\text{Filter } Y(x, y)| \quad < \text{Equation 1} >$$

$$D_{xy} = \arctan\left(\frac{\text{Filter } Y(x, y)}{\text{Filter } X(x, y)}\right)$$

$M_{xy}$: value of change rate magnitude at (x,y) coordinates
$D_{xy}$: value of change rate direction at (x,y) coordinates
Filter X(x,y): value of change rate magnitude in X direction at (x,y) coordinates
Filter Y(x,y): value of change rate magnitude in Y direction at (x,y) coordinates Here, Equation 1 represents one method of determining the change rate magnitude and change rate direction of the pixel, and the change rate magnitude and change rate direction of the pixel may be defined using various other methods. For example, the differential filter may obtain and process a differential value through a Sobel filter, a Prewitt filter, a Gradient, or the like. Further, in relation to the change rate magnitude, various methods such as size expression using Manhattan distance, size expression using Euclidean distance, and the like may be used.

Information on a change rate magnitude and a change rate direction of each of the plurality of pixels in the learning image may be stored in the change rate magnitude information storage table and the change rate direction information storage table, respectively. According to the embodiment of the present invention, the change rate magnitude of each of the plurality of pixels may be determined by removing unnecessary small change factors using a threshold value of a specific change rate magnitude in a manner such as a step function, where points which are smaller than or equal to a threshold value are set as 0 and removed.

Whether the pixel is a contour point forming a contour of an object may be determined based on the change rate magnitude of the pixel.

Whether the pixel is a contour point forming a contour may be determined based on contour point determination conditions 200 in a determination area. The contour point determination conditions 200 may include a plurality of sub-contour point determination conditions in consideration of a plurality of change directions with respect to the pixel. When at least one of the plurality of sub-contour point determination conditions is satisfied, it may be determined that the pixel is a contour point and information on the pixel may be stored in the contour point information storage table. A plurality of change directions for determining the determination area and the sub-contour point determination conditions may be set in various ways, and such an embodiment may also be included in the scope of the present invention.

The contour point information storage table may store the information on the contour points. For example, the contour point information storage table is a binary table, and may store a maximum value (e.g., 255) when it is determined that the pixel is a contour point and store a minimum value (e.g., 0) when it is determined that the pixel is not a contour point.

The pixel determined as the contour point may represent a geometric shape of the learning object. Geometric information on the contour point may be stored, and the geometric information may include information on a change rate magnitude, a change rate direction, and a contour point position.

Through the above procedure, the change rate magnitude information storage table and the change rate direction information storage table that store the information on the change rate magnitude and the change rate direction of each of the plurality of pixels in the learning image may be generated, and the contour point information table that includes the information on the contour point may be generated.

FIG. 3 illustrates conceptual diagrams illustrating information storage tables according to an embodiment of the present invention.

In FIG. 3, a change rate magnitude information storage table, a change rate direction information storage table, and a contour point information storage table are disclosed.

Referring to FIG. 3, three types of geometric information tables may be generated based on information on a change rate magnitude and a change rate direction of each of a plurality of pixels extracted from a learning image and information on contour points.

FIG. 3A illustrates an original learning image 300. FIG. 3B illustrates a change rate magnitude information storage table 310 generated based on the change rate magnitude. FIG. 3C illustrates a change rate direction information storage table 320 generated based on the change rate direction. FIG. 3D illustrates a contour point information storage table 330 in which the contour points satisfying contour point determination conditions are stored.

The above-described contour point information storage table 330 stores data that cannot distinguish geometric information to be determined in the learning image and that randomly satisfies the contour point determination conditions. Therefore, it may be determined that noise other than a contour of an actual learning object is a contour point. In order to solve the above problem, in the present invention, it is possible to remove noise, which is not a contour point of an object, by connecting the pixels in consideration of the change rate magnitude.

FIG. 4 illustrates conceptual diagrams illustrating a method of determining learning object contour points by removing noise according to an embodiment of the present invention.

In FIG. 4, a method of removing noise from among contour points and determining learning object contour points that are contour points of an actual learning object is disclosed.

Referring to FIG. 4, adjacent pixels having a change rate magnitude which is greater than or equal to a threshold value based on contour points may be connected as connection pixels and classified and clustered as one object unit, and then noise 400 may be removed so that learning object contour points 410 of an actual learning object may be determined. Hereinafter, the contour points from which the noise 400 is removed from among the points determined as the contour points on the basis of the contour point determination conditions may be expressed using the term "learning object contour points 410."

Pixels having a change rate magnitude which is greater than or equal to the threshold value among adjacent pixels around the contour points may be defined as the connection pixels on the basis of the change rate magnitude information storage table. Thereafter, the noise 400 other than the learning object contour points 410 among the contour points extracted by connecting the connection pixels may be removed. That is, the learning object contour points 410 and the noise 400 may be separated from each other through clustering to generate a connection pixel group by connecting the connection pixels having the change rate magnitude which is greater than or equal to the threshold value around the contour points. Specifically, the learning object contour point 410 and the noise 400 may be separated from each other based on a size of each connection pixel group, and thus the object may be selectively extracted.

When the change rate magnitude of the change rate magnitude information storage table is used, contours of the object are spread more widely so that the contours of the object may be spread without breaking. Therefore, it is possible to more accurately connect the contours of the learning object as connection pixels.

Specifically, the learning object may be selectively extracted by successively connecting the connection pixels having the change rate magnitude which is greater than or equal to the threshold value to form a connection pixel group and separating the learning object contour point 410 and the noise 400 from each other on the basis of a size of each connection pixel group.

In FIG. 4A, a method of separating the learning object contour point 410 and the noise 400 from each other using connection pixel groups is disclosed. Whether the connection pixel group is the learning object contour points 410 or the noise 400 may be determined based on the number of connection pixels included in the connection pixel group.

For example, using each of the number of connection pixels of each of the plurality of connection pixel groups as a sample, an average (K) of the sum of squares of the sample may be calculated as a noise determination reference value as shown in Equation 2 below.

$$K = \frac{1}{n}\sum_{i=0}^{n} \text{Size (Object}_i)^2 \qquad \text{<Equation 2>}$$

n: number of objects in image

Size(Object$_i$): number of contour points $i^{th}$ object

When a specific connection pixel group is less than or equal to the noise determination reference value, it may be determined that the specific connection pixel group is the noise 400 and is removed. The noise determination reference value as shown in Equation 2 above is an example and may be variously set, and such an embodiment may also be included in the scope of the present invention.

As illustrated in FIG. 4A, it may be determined that connection pixels having a relatively small change rate magnitude are the noise 400 and are removed. When an object clustering method using the connection pixel group is applied, the learning object contour points 410 and the noise 400 may be separated from each other based on the magnitude, and only geometric features of the learning object may be selectively extracted effectively while removing unnecessary information.

FIG. 4B illustrates a result of adjusting the noise determination reference value. FIG. 4B(a) illustrates a result of applying one-tenth of the noise determination reference value of Equation 2. FIG. 4B(b) illustrates a result of applying one-half of the noise determination reference value of Equation 2. FIG. 4B(c) illustrates a result of applying the noise determination reference value of Equation 2.

In the present invention, after the noise 400 is removed, the priority of the determined learning object contour points 410 may be determined and a geometric pattern matching procedure may be performed in consideration of the priority of the learning object contour points 410.

FIG. 5 illustrates a conceptual diagram illustrating a method of determining the priority of learning object contour points according to an embodiment of the present invention.

In FIG. 5, a method of more rapidly and accurately detecting an object by setting the priority of learning object contour points extracted after noise is removed and increasing a degree of spreading of contour points is disclosed.

Referring to FIG. 5, it may be assumed that the number of learning object contour points 500 is N for K selected learning objects. When the number of learning object contour points 500 is very large, N points should be compared with respect to the width×height of the entire area of a detection image for each point in the geometric pattern matching process. Therefore, a phenomenon in which the speed becomes very slow may occur.

In the present invention, N learning object contour points 500 to be matched may be separately extracted from among all of the N learning object contour points 500 by defining the priority for faster geometric pattern matching.

The learning object contour points show a clear difference as a change rate magnitude increases. Therefore, the matching procedure may be performed by giving the priority according to the change rate magnitude of the learning object contour point 500. However, in the case in which only the change rate magnitude of the learning object contour point 500 is considered when the overall geometrical aspect is considered, when pixels having a large change rate magnitude are concentrated in one direction of a learning object 510, only the corresponding pixels may be extracted, and thus the overall geometrical aspect of the learning object 510 cannot be considered.

Therefore, in the present invention, the learning object 510 may be divided into a plurality of regions 520, and the learning object contour point 500 having the largest change rate magnitude may be sequentially extracted from each of the plurality of regions 520 without overlapping the region 520. When the learning object 510 is divided into M regions 520, the learning object contour point 500 having the largest change rate magnitude may be extracted from each of the M regions 520 while traversing the divided M regions 520 without overlapping the region.

After one traversal is completed for the M regions 520, re-traversing may be performed on the M regions 520 and the learning object contour point 500 having the largest change rate magnitude may be extracted from the remaining learning object contour points 500 in each of the M regions 520. In this way, the priority of the learning object contour point 500 may be set by extracting the learning object contour point 500 having the largest change rate magnitude from the remaining learning object contour points 500 through continuous re-traversal of the M regions.

In this way, by increasing the degree of spreading of the learning object contour points 500, the learning object contour points 500 reflecting the overall geometric structure of the learning object 510 may be arranged in order of priority.

The learning object 510 may be divided into regions in various ways. For example, after uniformly dividing the width and length into a plurality of n×n regions using a boundary rectangle based on a region of interest (ROI) of the learning object 510, traversing may be performed on the plurality of regions. For a figure such as a circle, the region division reflecting a shape of the learning object 510 may be performed by spreading the degree of spreading to fit the image by dividing a radius into equal parts based on the center. When all learning objects 510 are processed at one time, points of some learning objects 510 may not be extracted. Therefore, when there are K learning objects 510, the priority of the learning object contour point 500 for the K learning objects 510 may be assigned in the same way as a method of distributing according to a size ratio of the K learning objects 510, and a reference geometric pattern contour point 550 having geometric features and an increased degree of spreading and a reference geometric pattern contour point group including the reference geometric pattern contour point 550 may be generated. The reference geometric pattern contour point group may include information in which the plurality of learning object contour points 500, to which a priority is assigned by the above-described method, are sequentially listed.

Figure 6:
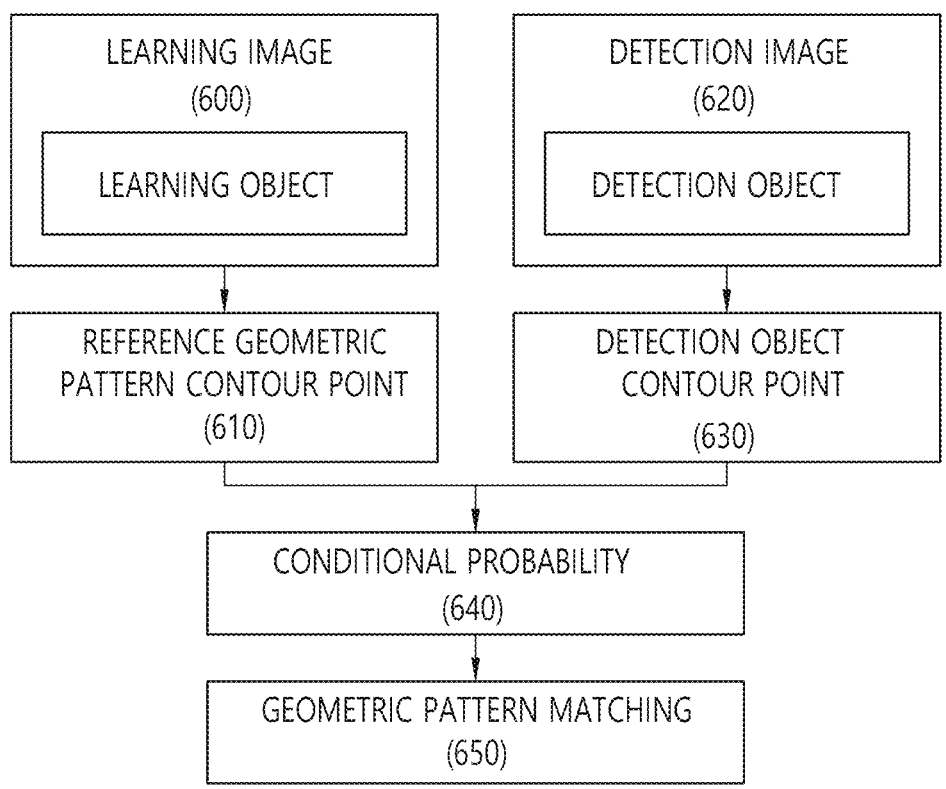
FIG. 6 is a conceptual diagram illustrating a geometric pattern matching method for a learning image and a detection image according to an embodiment of the present invention.

FIG. 6 is a conceptual diagram illustrating a geometric pattern matching method for a learning image and a detection image according to an embodiment of the present invention.

In FIG. 6 a method of detecting a detection object corresponding to a learning object in a detection image 620 by matching a reference geometric pattern contour point 610 extracted from a learning image 600 and a detection object contour point 630 extracted from the detection image 620 is disclosed.

Referring to FIG. 6, in the same manner as used in the learning image 600, a change rate magnitude information storage table, a change rate direction information storage table, and a contour point information storage table may be determined for the detection image 620.

A conditional probability 640 may be used for geometric pattern matching 650 on the basis of the reference geometric pattern contour point 610 extracted from the learning image 600. Equation 3 is an example of the conditional probability 640.

$$P_{a,b}(\text{detection} \mid \text{learning}) = \frac{\text{number of points in which learned contour point and feature match in detection image area of } (a, b) \text{ coordinates}}{\text{number of learned contour points}}$$

$$= \frac{1}{N}\sum_{i=1}^{N} I((|D_L(x_i, y_i) - D_F(x_i + a, y_i + b)| < T_D) \wedge C_L(x_i, y_i)$$

$$= C_F(x_i + a, y_i + b)))$$

<Equation 3>

I(A): unit step function representing 1 when condition A is satisfied and 0 otherwise $C_L(x,y)$: contour point value at (x,y) coordinates in learning image $C_F(x,y)$: contour point value at (x,y) coordinates in detection image $D_L(x,y)$: direction value of change rate at (x,y) coordinates in learning image $D_F(x,y)$: direction value of change rate at (x,y) coordinates in detection image $T_D$: threshold value for difference in direction of change rate $(x_i, y_i)$: position of contour point in learning image a: X-coordinate of detection position in detection image b: Y-coordinate of detection position in detection image N: number of samples of contour points extracted in learning process The learning image 600 and the detection image 620 are independent of each other. The geometric pattern matching 650 for the detection object may be performed on the detection image 620 using the conditional probability 640 for how many of the detection object contour points 630 match based on the reference geometric pattern contour point 610. The conditional probability 640 in Equation 3 is an example, and whether the reference geometric pattern contour point 610 and the detection object contour point 630 match may be determined in various other ways. For example, various modifications are possible according to a desired state, such as giving different weights to each learning object corresponding to the reference geometric pattern contour point 610.

In a conventional method such as template matching, similarity is determined by matching all pixels within an ROI. By doing this, the processing is performed by actually comparing the similarity between the learning image 600 and the detection image 620. However, in the learning image 600, not only the importance of pixels representing object features cannot be classified, but also unnecessary information due to occlusion and noise affects a similarity determination value. Therefore, when the occlusion phenomenon occurs, the similarity is very low or normal matching is not performed.

However, in the method of matching the conditional probability using the reference geometric pattern contour point 610 extracted from the learning image 600 according to the embodiment of the present invention, how much geometric feature information is satisfied in the detection image 620 based on a learned geometric information set, not how similar the regions in the ROI are, is determined.

Therefore, by matching the objects around the position with a large degree of coincidence with the reference geometric pattern contour point 610, even when the occlusion of areas other than the object on the detection image 620, occlusion of some objects, etc. occur, the geometric pattern matching 650 may be performed on the objects having the largest number of positions having the same features in the detection image 620. That is, the geometric pattern matching 650 based on the reference geometric pattern contour point 610 can accurately approach positions having the same geometric features while ignoring object occlusion or noise on the detection image 620.

The determination of how many the detection object contour points 630 match based on the reference geometric pattern contour point 610 may be a determination on the similarity of the geometric shape in consideration of the position and direction of the learning object contour point/detection object contour point. A criterion for determining that the detection object contour points 630 match based on the reference geometric pattern contour point 610 is that the detection object contour points 630 are determined to match when a difference between the change rate direction value of the reference geometric pattern contour point 610 and the change rate direction value of the detection object contour point 630 is less than or equal to a threshold angle value with respect to an $i^{th}$ learning object contour point in the learning image 600 as shown in Equation 3.

Since the learning image 600 and the detection image 620 are quantized, there may be an error in a change rate direction value of the reference geometric pattern contour point 610 and the detection object contour point 630. Therefore, when a difference in angle between the change rate direction value of the reference geometric pattern contour point 610 that is a comparison target and the detection object contour point 630 is less than or equal to a threshold angle value, it may be determined that the reference geometric pattern contour point 610 and the detection object contour point 630 match.

The threshold angle value is not a fixed value, but may be adaptively set according to the image quality (or quantization noise of the image) of the learning image 600 and/or the detection image 620.

Hereinafter, a more specific geometric pattern matching method for determining whether a detection object is present on the detection image 620 is disclosed.

Figure 7:
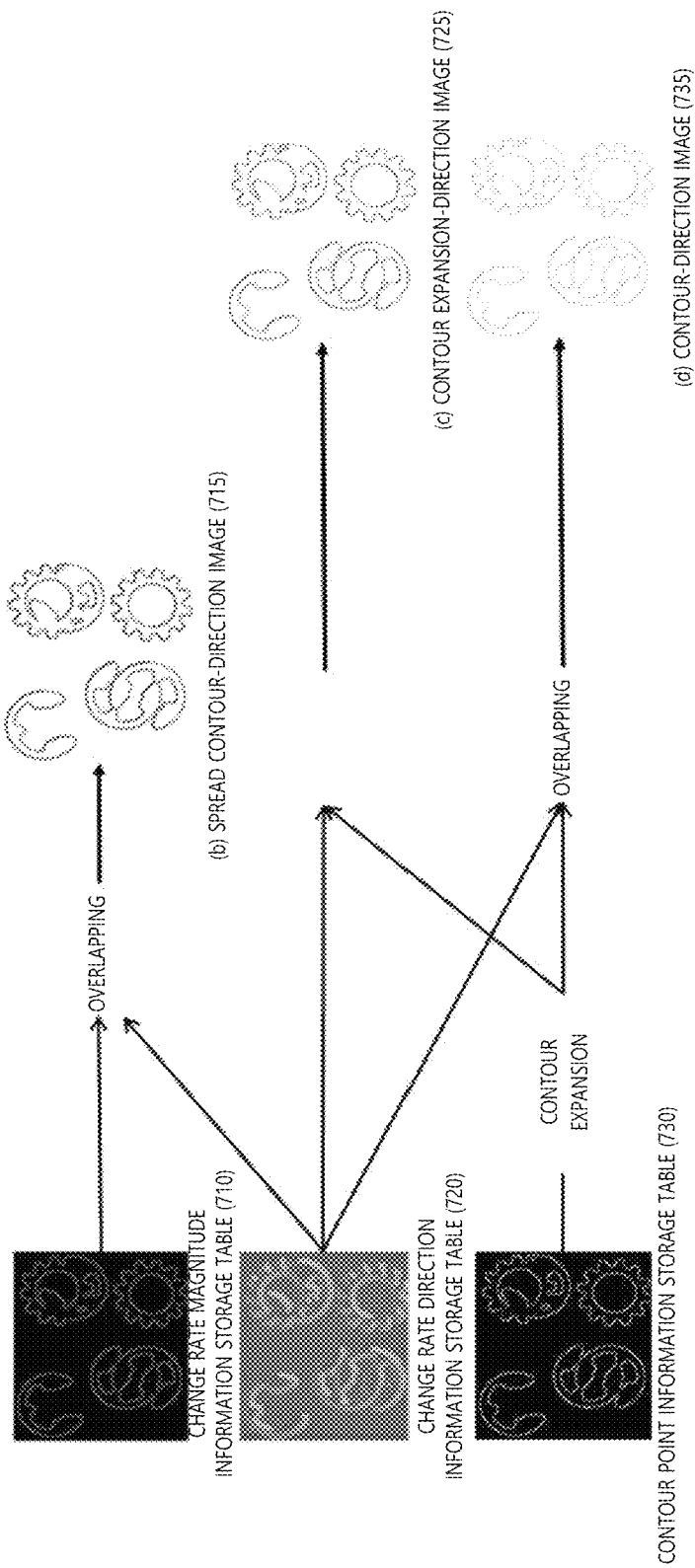
FIG. 7 illustrates a conceptual diagram illustrating a geometric pattern matching method for determining whether a detection object is present on a detection image according to an embodiment of the present invention.

FIG. 7 illustrates a conceptual diagram illustrating a geometric pattern matching method for determining whether a detection object is present on a detection image according to an embodiment of the present invention.

In FIG. 7, a method of performing sequential geometric pattern matching using an overlapping information image generated based on information storage tables is disclosed.

Referring to FIG. 7, a plurality of different overlapping images for geometric pattern matching of the detection object may be used.

Different overlapping images may be generated based on the information storage tables for the detection image, and geometric matching of the object may be performed through sequential matching using the overlapping images.

FIG. 7A illustrates a detection image 700.

FIG. 7B illustrates a spread contour-direction image 715 generated by overlapping a change rate magnitude information storage table 710 and a change rate direction information storage table 720 of the detection image. Specifically, when a size of the spread contour-direction image 715 is present in the change rate magnitude information storage table 710, the spread contour-direction image 715 may be generated to overlap by substituting a value of the change rate magnitude information storage table 710.

FIG. 7C illustrates a contour expansion-direction image 725 generated by overlapping the change rate direction information storage table 720 and a contour point information storage table 730. The contour expansion-direction image 725 may be generated by increasing the contour point information storage table 730 through contour expansion and then may overlap by substituting the value of the change rate direction information storage table 720 when there is information.

FIG. 7D illustrates a contour-direction image 735 generated by overlapping the change rate direction information storage table 720 and the contour point information storage table 730. When contour point information is present in the contour point information storage table 730, the contour-direction image 735 may be generated to overlap by substituting a value of the change rate direction information storage table 720.

The spread contour-direction image 715 has information about geometric features while maintaining all the degree of spreading of the boundary near the contour. The spread contour-direction image 715 is an image for maintaining a rough geometric shape and utilizing direction information, not grasping a boundary of a strict position.

Unlike the spread contour-direction image 715, the contour expansion-direction image 725 is an image that increases a tolerance for the position of the contour point by expanding the contours on the basis of actually measured contour points and has geometric direction information about the tolerance. The contour expansion is to consider errors that may appear when boundary shake is taken into account. For the contour expansion, a method of expanding the boundary by increasing the boundary up, down, left and right on the basis of the contour points of the contour point information storage table 730 or a method of using morphological expansion may be used.

The contour-direction image 735 is an image for measuring a precise position and score by leaving direction information only for information on an accurate position of the contour point.

In the geometric pattern matching process, the position is inferred through a three-step geometric matching process using a total of three images of the spread contour-direction image 715, the contour expansion-direction image 725, and the contour-direction image 735.

Figure 8:
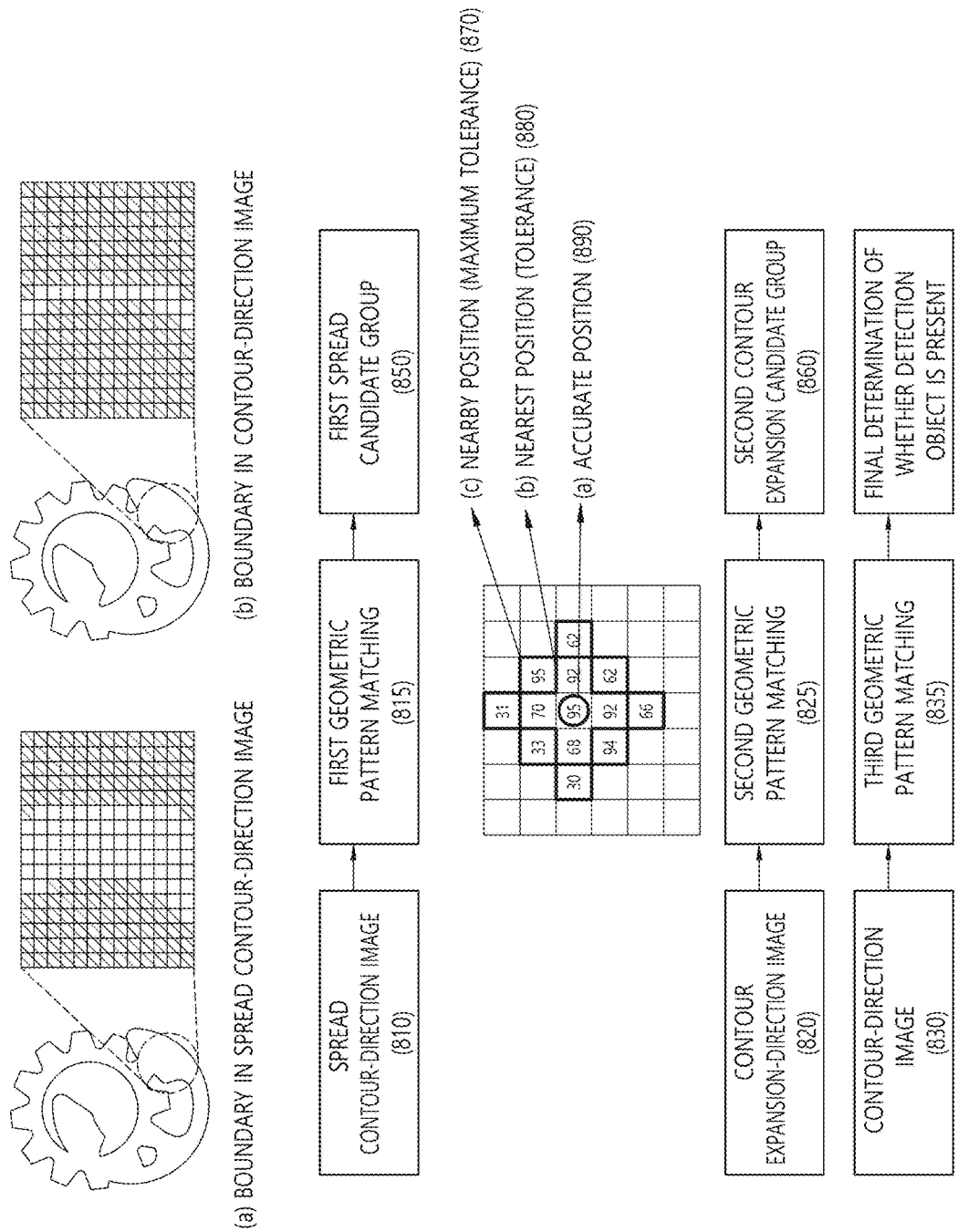
FIG. 8 illustrates a conceptual diagram illustrating a sequential geometric pattern matching process according to an embodiment of the present invention.

FIG. 8 illustrates a conceptual diagram illustrating a sequential geometric pattern matching process according to an embodiment of the present invention.

In FIG. 8, whether a detection object is present on a detection image may be determined through a three-step geometric pattern matching process using a total of three images of a spread contour-direction image 810, a contour expansion-direction image 820, and a contour-direction image 830.

Referring to FIG. 8, weak geometric similarity matching using the spread contour-direction image 810 may be performed as first geometric pattern matching 815. The weak geometric similarity matching aims to eliminate most positions with few geometric features. The spread contour-direction image 810 has a characteristic in that values of the change rate magnitude information storage table are spread over a wide range with respect to the boundary.

FIG. 8A illustrates images of a region to be marked as a boundary in the spread contour-direction image 810, and FIG. 8B illustrates images of a region to be marked as a boundary in the contour-direction image 830. Unlike the contour-direction image 830, in the case of the spread contour-direction image 810, all extended boundaries of a wide range except for a black region (the region in which the change rate magnitude is 0) may be handled as extended contour points.

Based on the extended contour points of the spread contour-direction image 810, it may be determined that a position that satisfies a rough geometric similarity condition is a matched position even when the position is not an accurate position. When the geometric similarity condition is not satisfied even in the spread contour-direction image 810, the corresponding position is excluded because it is difficult to see that the position has similarity.

The weak geometric similarity matching based on the spread contour-direction image 810 may use only a first upper threshold percentage (e.g., about 10 to 20%) of the entire geometric contour information. In consideration of the priority of the reference geometric pattern contour point described above, the geometric similarity matching may be performed using the reference geometric pattern contour points of the first upper threshold percentage (e.g., top 10 to 20%) having a higher priority. When the reference geometric pattern contour points of a first threshold percentage (e.g., about 20%) among the reference geometric pattern contour points of the first upper threshold percentage (e.g., top 10 to 20%) having a higher priority matches the detection object contour points, the reference geometric pattern contour points of the first threshold percentage (e.g., about 20%) may be set as a first spread candidate group 850 that needs to be additionally determined.

As described above, there is no problem in that the object cannot be detected in the detection image due to the occlusion according to the estimated contour point priority setting in an unbiased manner in consideration of the degree of spreading of the contour point.

Next, as a second step of the geometric pattern matching process, in the case of weak geometric similarity matching using the contour expansion-direction image 820, specific geometric features of the first spread candidate group 850 determined through the first geometric pattern matching 815 are identified.

After the first geometric pattern matching 815 is performed, second geometric pattern matching 825 based on the contour expansion-direction image 820 may be performed.

The contour expansion-direction image 820 is an image in which the sensitivity of a minute position difference with respect to the contour positions is lowered through contour expansion with respect to a boundary range of the contour-direction image 830.

The matching based on the contour expansion-direction image 820 allows for positional error according to distance to perform geometric similarity matching with relatively low sensitivity. A tolerance for the positional error according to the distance may be determined in various ways.

For example, the tolerance for the positional error is acceptable in Equations 4(a) and 4(b) of Equation 4 below, and when visualizing the tolerance for the positional error, a nearest position 880 is acceptable based on an accurate position 890.

$$I((|D_L(x_i,y_i)-D_F(x_i+a,y_i+b)|<T_B\hat{}(C_L(x_i,y_i)=C_F(x_i+a,y_i+b)))$$

<Equation 4>

(a) Accurate Position $$I((|D_L(x_i,y_i)-D_F(x_i+a+1,y_i+b)|<T_D\hat{}(C_L(x_i,y_i)=C_F(x_i+a+1,y_i+b)))$$

$$I((|D_L(x_i,y_i)-D_F(x_i+a-1,y_i+b)|<T_D\hat{}(C_L(x_i,y_i)=C_F(x_i+a-1,y_i+b)))$$

$$I((|D_L(x_i,y_i)-D_F(x_i+a,y_i+b+1)|<T_D\hat{}(C_L(x_i,y_i)=C_F(x_i+a,y_i+b+1)))$$

$$I((|D_L(x_i,y_i)-D_F(x_i+a,y_i+b-1)|<T_D\hat{}(C_L(x_i,y_i)=C_F(x_i+a,y_i+b-1)))$$

(b) Nearest Position $$I((|D_L(x_i,y_i)-D_F(x_i+a+2,y_i+b)|<T_D\hat{}(C_L(x_i,y_i)=C_F(x_i+a+2,y_i+b)))$$

$$I((|D_L(x_i,y_i)-D_F(x_i+a,y_i+b+2)|<T_D\hat{}(C_L(x_i,y_i)=C_F(x_i+a,y_i+b+2)))$$

$$I((|D_L(x_i,y_i)-D_F(x_i+a+2,y_i+b)|<T_D\hat{}(C_L(x_i,y_i)=C_F(x_i+a-2,y_i+b)))$$

$I((|D_L(x_i,y_i)-D_F(x_i+a,y_i+b-2)|<T_D\hat{\ }(C_L(x_i,y_i)=C_F(x_i+a,y_i+b-2)))$ $I((|D_L(x_i,y_i)-D_F(x_i+a+1,y_i+b-1)|<T_D\hat{\ }(C_L(x_i,y_i)=C_F(x_i+a-1,y_i+b+1)))$ $I((|D_L(x_i,y_i)-D_F(x_i+a-1,y_i+b-1)|<T_D\hat{\ }(C_L(x_i,y_i)=C_F(x_i+a-1,y_i+b-1)))$ $I((|D_L(x_i,y_i)-D_F(x_i+a-1,y_i+b+1)|<T_D\hat{\ }(C_L(x_i,y_i)=C_F(x_i+a-1,y_i+b+1)))$ $I((|D_L(x_i,y_i)-D_F(x_i+a+1,y_i+b+1)|<T_D\hat{\ }(C_L(x_i,y_i)=C_F(x_i+a+1,y_i+b+1)))$ (c) Nearby Position I(A): unit step function representing 1 when condition A is satisfied and 0 otherwise $D_L(x,y)$: direction value of change rate at (x,y) coordinates in learning image $D_F(x,y)$: direction value of change rate at (x,y) coordinates in detection image $T_D$: threshold value for difference in direction of change rate $C_L(x,y)$: contour point value at (x,y) coordinates in learning image $C_F(x,y)$: contour point value at (x,y) coordinates in detection image $(x_i,y_i)$: position of an contour point in learning image a: X-coordinate of detection position in detection image b: Y-coordinate of detection position in detection image In each tolerance in Equation 4, when a condition of (a) is satisfied, the position is the accurate position 890. When the condition of (a) is not satisfied and at least one of conditions of (b) is satisfied, the position is the nearest position 880. When all of the conditions of (a) and (b) are not satisfied and at least one of conditions of (c) is satisfied, the position is the nearby position 870.

When the nearest position 880 is accepted according to the tolerance for the positional error, the geometric pattern matching is performed including all noise, and thus the possibility of errors occurring in the geometric pattern matching process is increased. However, in the confirmation of the contour point in the tolerance for the positional error for the first spread candidate group 850 through the first geometric pattern matching 815, it may be determined that the contour point is a minute error generated in the process of selecting a boundary point according to quantization noise, not noise, or the state of the camera. That is, the geometric similarity matching is performed on the first spread candidate group 850 determined through the first geometric pattern matching 815, and thus a more effective matching procedure may be performed.

In the geometric similarity matching using the contour expansion-direction image 820, a quantity with the same characteristic of the contour point may be measured using a second upper threshold percentage (e.g., about 25 to 40%) of the entire geometric contour information and the similarity may be calculated by assigning weights according to the error distance.

Specifically, in consideration of the priority of the reference geometric pattern contour point described above, the geometric similarity matching may be performed using the reference geometric pattern contour point of the second upper threshold percentage (e.g., top 25 to 40%) having a higher priority, and the similarity of the geometric pattern may be determined by assigning weights according to an error distance between the reference geometric pattern contour point of the second threshold upper percentage (e.g., top 25 to 40%) and the detection object contour point.

A second contour expansion candidate group 860 obtained through the second geometric pattern matching 825 serves to grasp clearer geometric position information, unlike the process of mainly removing unnecessary candidate groups in the first geometric pattern matching 815. According to the magnitude of the similarity of the geometric pattern, the positions are classified into positions where the geometric pattern is similar to the candidate group mixed due to noise and positions where the geometric pattern is similar and is determined to be most accurately fitted. When the positions are arranged in an order of magnitude of the similarity of the geometric pattern, a position determined to be most accurately fitted may be determined.

As a final step, third geometric pattern matching 835 using the contour-direction image 830 may be performed. In the third geometric pattern matching 835, the contour-direction image 830 and the contour expansion-direction image 820 are used.

In the contour expansion-direction image 820, an accurate position is also determined based on the first expanded image. However, in the third geometric pattern matching 835 based on the contour-direction image 830, only when the contour expansion-direction image 820 accurately matches the contour-direction image 830, it may be determined that a position is the accurate position and a high weight may be assigned. In the case in which the contour expansion-direction image 820 is accurately fitted to the contour-direction image 830 but a tolerance needs to be searched for, whether the position is included within the tolerance may be checked using the contour expansion-direction image 820.

The geometric similarity matching using the contour-direction image 830 is similar to the second geometric pattern matching 825, but there is a difference in the tolerance and the number of reference geometric pattern contour points used. In the third geometric pattern matching 835, the tolerance is accepted up to the nearest position 880 and the nearby position 870, and weights are assigned according to the distance.

Unlike the first geometric pattern matching 815 and the second geometric pattern matching 825, in the third geometric pattern matching 835, finally, in order to perform the geometric pattern matching in consideration of all reference geometric patterns, the geometric pattern matching may be performed on all of the reference geometric pattern contour points and the detection object contour points.

As the third geometric pattern matching 835 using the contour-direction image 830 is performed, all of the geometric similarity matching is performed based on the accurate position. By extending the tolerance to the nearby position, the geometric pattern matching may be performed more effectively even when boundary shake due to quantization rather than noise occurs.

That is, not only all of the geometric pattern matching may be performed through matching considering all reference geometric pattern contour points, but also the loss of geometric information due to occlusion or image brightness is reflected, thereby indicating the difference in similarity of the geometric pattern, and thus it may be differentiated by status.

FIG. 9 illustrates conceptual diagrams illustrating a three-step geometric pattern matching process according to an embodiment of the present invention.

FIG. 9A illustrates first geometric pattern matching 910.

Referring to FIG. 9A, a first spread candidate group that satisfies a minimum condition in which there is the similarity of geometric patterns rather than accurate positions may be determined using a spread contour-direction image that can include a wide range of extended contour points.

FIG. 9B illustrates second geometric pattern matching 920.

Referring to FIG. 9B, a second contour expansion candidate group may be determined by performing geometric similarity matching on the first spread candidate group in consideration of a tolerance based on a contour expansion-direction image.

FIG. 9C illustrates third geometric pattern matching 930.

Referring to FIG. 9C, for the second contour expansion candidate group, it is possible to approach accurate positions by comparing positions in consideration of all reference geometric pattern contour points, but by increasing a tolerance to the maximum, whether a detection object matches a learning object may be finally determined by performing determination robust against boundary shake caused by quantization.

Figure 10:
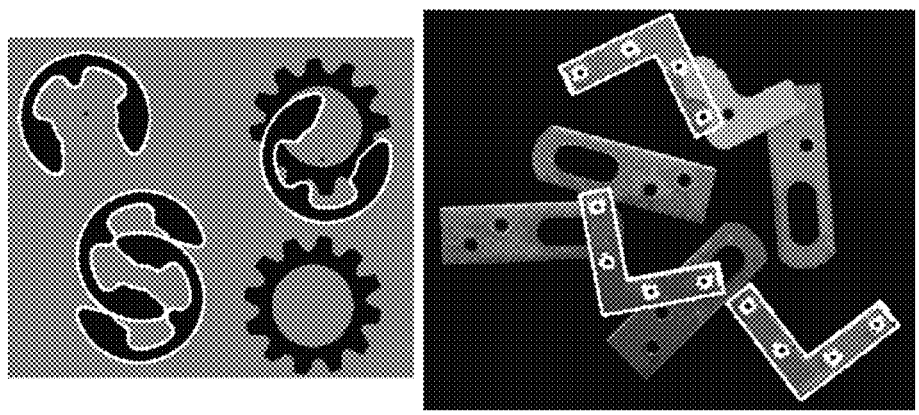
FIG. 10 illustrates photographs obtained by performing geometric pattern matching according to an embodiment of the present invention.

FIG. 10 illustrates photographs obtained by performing geometric pattern matching according to an embodiment of the present invention.

Referring to FIG. 10, a method of detecting a detection object that matches a learning object with a geometric pattern through the above-described geometric pattern matching procedure based on the conditional probability even for an obscured detection image is disclosed.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well-known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

According to the present invention, in order to rapidly detect identical or similar patterns on a detection image using a conditional probability using a geometric pattern that meets a given condition, pattern matching can be performed rapidly and accurately at low cost by performing geometric pattern matching using an algorithm that is robust to noise and an occlusion phenomenon of a detection image.

Further, according to the present invention, it is possible to perform matching that is robust to noise and occlusion by enabling the extraction of a geometric pattern for a desired object selectively rather than learning a geometric pattern for a randomly selected object and by matching learned geometric patterns for a desired target detection object using a conditional probability.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompasses all modifications and equivalents that fall within the scope of the appended claims.

What is claimed is:

1. A geometric pattern matching method comprising:
determining, by a geometric pattern matching device, information on reference geometric pattern contour points for a learning object on a learning image;
determining, by the geometric pattern matching device, information on detection object contour points for a detection object on a detection image; and
performing, by the geometric pattern matching device, geometric pattern matching between the learning object and the detection object on the basis of the information on the reference geometric pattern contour points, the information on the detection object contour points, and a priority of learning object contour points,
wherein the information on the reference geometric pattern contour points is determined based on the learning object contour points selectively extracted by removing noise from initial contour points extracted from the learning image using change rate magnitude information or change rate direction information of the learning object, the noise comprising connection pixels having a relatively small change rate magnitude as compared to the learning object contour points, the noise removal including connecting connection pixels having a change rate magnitude greater than or equal to a threshold value, determining a connection pixel group having a size less than or equal to a noise determination reference value and removing the connection pixel group,
wherein the information on the detection object contour points is determined based on a plurality of images determined by overlapping the change rate magnitude information, the change rate direction information, or contour point information of the detection object,
wherein the information on the reference geometric pattern contour points is determined by setting, after removing the noise, the priority of the learning object contour points in consideration of a degree of spreading of the learning object contour points and according to change rate magnitudes of the learning object contour points, the spreading including dividing the learning object into a plurality of regions such that a learning object contour point having a largest change rate magnitude is sequentially extracted from each region of the plurality of regions without overlapping the region, and
wherein by increasing a degree of the spreading of the learning object contour points, the learning object contour points reflect an overall geometric structure of the learning object arranged in order of the priority.

2. The method of claim 1, wherein:
the geometric pattern matching is performed based on a conditional probability; and
the conditional probability is determined in consideration of whether at least one of the plurality of learning object contour points determined in consideration of the priority matches the plurality of detection object contour points.

3. The method of claim 2, wherein in matching the conditional probability using the reference geometric pattern contour point extracted from the learning image, how much geometric feature information is satisfied in the detection image based on a learned geometric information set is determined, not how similar regions in a region of interest are.

4. The method of claim 3, wherein by matching the detection object around a position with a large degree of coincidence with the reference geometric pattern contour points, even when the occlusion occurs, the geometric pattern matching is performed on the detection object having the largest number of position having the same feature in the detection image.

5. The method of claim 4, wherein the geometric pattern matching based on the reference geometric pattern contour points accurately approaches positions having same geometric features while ignoring object occlusion or noise on the detection image.

6. The method of claim 1, wherein
the plurality of images include a spread contour-direction image, a contour expansion-direction image, and a contour-direction image;
the spread contour-direction image is generated by overlapping a change rate magnitude information storage table and a change rate direction information storage table, which are generated based on the change rate magnitude information and the change rate direction information of the detection object, respectively;
the contour expansion-direction image is generated by overlapping the change rate direction information storage table and a contour information storage table, which are generated based on the change rate direction information and the contour point information of the detection object, respectively; and
the contour-direction image is generated by overlapping the change rate direction information storage table and the contour information storage table.

7. The method of claim 6, wherein the spread contour-direction image has information about geometric features while maintaining all the degree of spreading of a boundary near a contour.

8. The method of claim 6, wherein the spread contour-direction image is an image for maintaining a rough geometric shape and utilizing direction information, not grasping a boundary of a strict position.

9. The method of claim 6, wherein the contour expansion-direction image is an image that increases a tolerance for position of a contour point by expanding a contour based on actually measured contour points and has geometric direction information about the tolerance.

10. The method of claim 6, wherein contour expansion considers errors occurring when boundary shake is taken into account.

11. The method of claim 6, wherein the contour-direction image is an image for measuring a precise position and score based on direction information only for an accurate position of a contour point.

12. The method of claim 1, wherein in order to extract reference geometric pattern information based on a plurality of pixels in the learning image, direction information of each of the plurality of pixels is determined.

13. The method of claim 12, wherein the direction information is determined based on a differential filter and includes information on a change rate magnitude and a change rate direction of the pixel in x and y directions obtained using the differential filter.

14. The method of claim 13, wherein whether the pixel is a contour point forming a contour of the learning object is determined based on the change rate magnitude of the pixel.

* * * * *